United States Patent

Laxton et al.

[11] Patent Number: 5,915,631
[45] Date of Patent: Jun. 29, 1999

[54] PURSE ANTI-THEFT DEVICE

[76] Inventors: Dean M. Laxton, P.O. Box 50054, Midland, Tex. 79701-0054; Lendell W. Laxton, P.O. Box 4425, Victoria, Tex. 77903; Donna M. Tidwell, P.O. Box 2112, Bloomington, Tex. 77951

[21] Appl. No.: 09/015,403

[22] Filed: Jan. 29, 1998

[51] Int. Cl.⁶ .......................... A44B 11/00; A44B 13/00
[52] U.S. Cl. ........................ 24/302; 24/599.5; 24/600.7
[58] Field of Search .................... 24/302, 599.5, 24/598.2, 573.5, 3.13, 601.6, 601.7, 598.1

[56] References Cited

U.S. PATENT DOCUMENTS

| | | | |
|---|---|---|---|
| 296,764 | 4/1884 | Marquardt | 24/600.7 |
| 463,169 | 11/1891 | Scott . | |
| 836,693 | 11/1906 | Marshall . | |
| 1,521,387 | 12/1924 | Pericle | 24/600.7 |
| 2,218,932 | 10/1940 | Collins | 24/598.2 |
| 2,677,864 | 5/1954 | Nielsen | 24/599.5 |
| 2,783,926 | 3/1957 | Wise . | |
| 3,286,751 | 11/1966 | Dishart . | |
| 3,949,915 | 4/1976 | Burhans . | |
| 4,419,874 | 12/1983 | Brentini | 24/600.6 |
| 4,689,860 | 9/1987 | Suchowski | 24/600.7 |
| 4,804,122 | 2/1989 | Knox . | |
| 5,542,687 | 8/1996 | Harris . | |

FOREIGN PATENT DOCUMENTS

| | | | |
|---|---|---|---|
| 61786 | 10/1913 | Austria | 24/302 |
| 1194907 | 11/1959 | France | 24/302 |

Primary Examiner—Victor N. Sakran
Attorney, Agent, or Firm—Stephen R. Greiner

[57] ABSTRACT

A security device for preventing the theft of a purse or other item from a shopping cart. The device includes a flexible strap having opposed, first and second ends. A snap hook is secured to the first end of the strap for attachment to a purse. A ring is secured to the second end of said strap for attachment to a shopping cart. In use, the device acts like a leash to prevent unauthorized removal of the purse.

8 Claims, 1 Drawing Sheet

PURSE ANTI-THEFT DEVICE

FIELD OF THE INVENTION

The present invention relates generally to a device for preventing the theft or loss of a purse or handbag.

BACKGROUND OF THE INVENTION

Shoppers frequently use carts provided by merchants to gather items which they intend to purchase. To further free their hands while browsing, shoppers frequently place their purses and handbags in the carts. Purse snatchers have targeted these purses and handbags for theft thereby resulting in a loss to shoppers.

Proposals for reducing such thefts have been made in the past. Often such proposals have included a cumbersome, tether mechanism forming an integral part of a purse or handbag. Other proposals have included the placement of compartments within shopping carts to store valuables. None of these proposals has found widespread commercial acceptance. It appears that the added weight and inconvenience of carrying a tether from place to place as well as the significant cost of purchasing shopping carts with compartments has discouraged the use of such items.

SUMMARY OF THE INVENTION

In light of the problems associated with the past proposals for reducing the theft of items from shopping carts, it is a principal object of the invention to provide a device which may be easily and inexpensively installed on a conventional shopping cart by a merchant for preventing items of value, such as purses, belonging to shoppers from being stolen.

It is another object of the invention to provide an anti-theft device of the type described which is not, and can not, be easily carried with a handbag or purse away from a shopping cart after installation of the device on the cart.

It is a further object of the invention to provide a purse anti-theft device which will not tear or otherwise damage a purse or handbag when used.

It is an object of the invention to provide improved elements, and arrangements thereof, in a purse anti-theft device which is lightweight in construction, inexpensive in manufacture, and fully effective in use.

Briefly, the anti-theft device in accordance with this invention achieves the intended objects by featuring a flexible strap having opposed, first and second ends. A snap hook is secured to the first end of the strap for releasable attachment to a purse. A ring is secured to the second end of said strap for attachment to a shopping cart.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
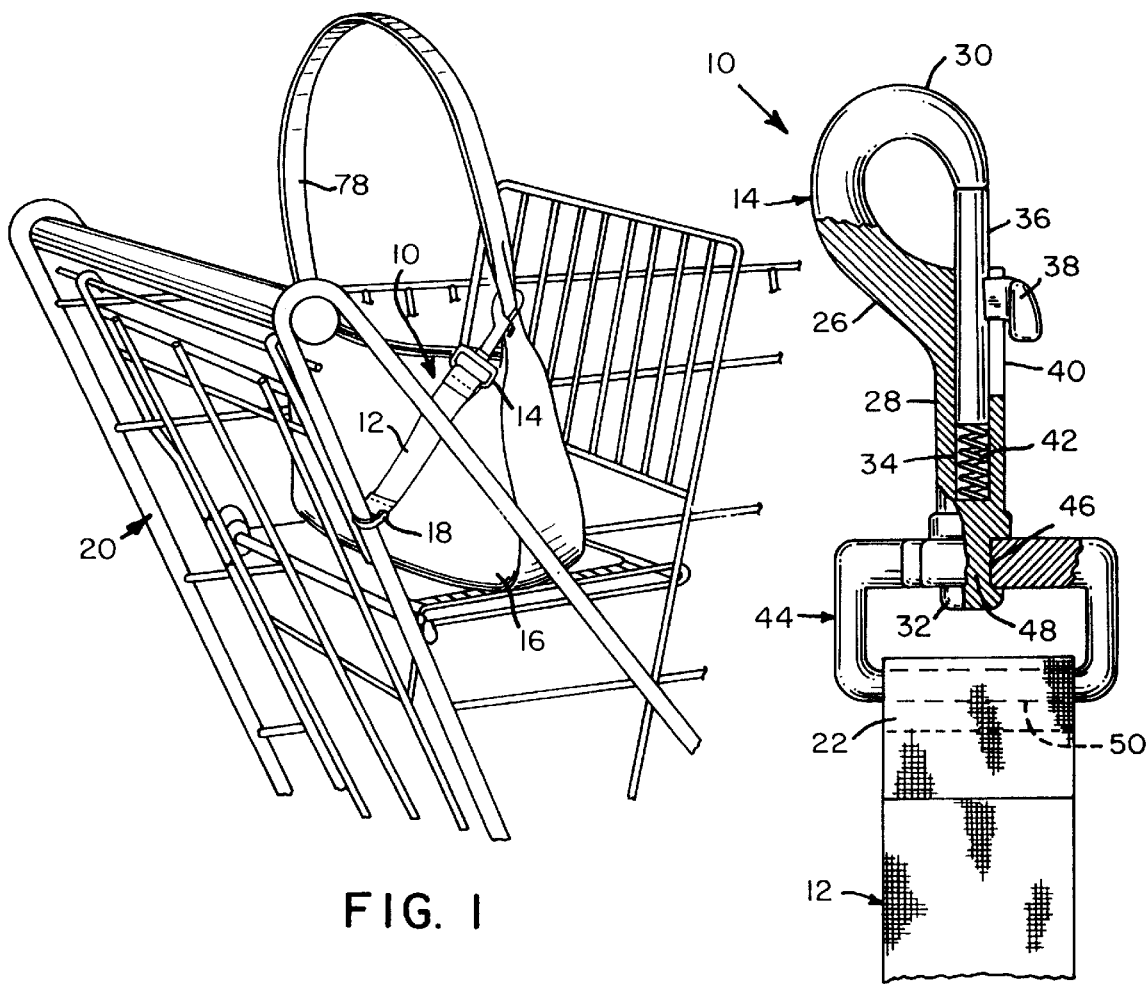
FIG. 1 is a perspective view of a purse anti-theft device in accordance with the present invention shown securing a purse within a conventional shopping cart.
Figure 2:
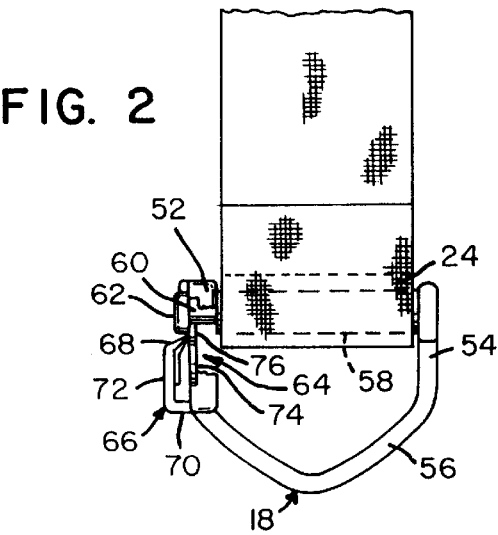
FIG. 2 is an orthographic side view of the purse anti-theft device of FIG. 1 with portions broken away to show details thereof.
Figure 3:
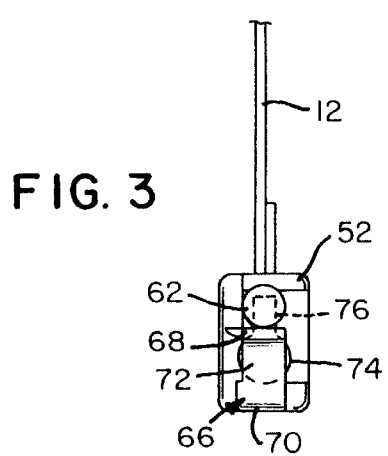
FIG. 3 is a side view of the ring of the purse anti-theft device.

Referring now to FIGS., a purse anti-theft device in accordance with the present invention is shown at 10. The anti-theft device 10 includes a flexible strap 12 having a snap hook 14 secured to one of its ends for attachment to a purse 16. Secured to the end of the strap 12 opposite the snap hook 14 is a ring 18 for attachment to a shopping cart 20 or other selected anchor.

The strap 12 is formed from a piece of durable fabric webbing about ten inches (25.4 cm) long. Loops 22 and 24 are formed at the opposite ends of the webbing by folding the webbing back upon itself and sewing the overlapping portions together at a predetermined distance from the fold. After sewing, the overall length of the strap is reduced to about eight inches (20.3 cm).

The snap hook 14 includes a body 26 having a shank 28 with an arcuate portion 30 at one of its ends and a pin 32 at the other. The shank 28 is provided with a longitudinal bore 34 for receiving a reciprocating bolt 36. The bolt 36 has a shoulder 38 projecting from one of its sides which slides in a slot 40 formed in the side of the shank 28. A compressed spring 42, positioned within the bottom of the bore 34 urges the bolt 36 outward into engagement with the arcuate portion 30.

A coupling 44 is pivotally secured to the body 26 of the snap hook 14. To this end, a portion of the coupling 44 has an aperture 46 adapted to loosely receive a narrowed portion 48 of the pin 32. Another portion 50 of the coupling 44 is positioned in the loop 22 of the strap 12.

The ring 18 is integrally formed of resilient plastic and includes a pair of legs 52 and 54 joined by a V-shaped cross member 56. A bar 58 extends outwardly from the leg 54 opposite the cross member 56, through the loop 24 of the strap 12, and toward the leg 52. The bar 58 has a narrowed portion 60 which defines a head 62. The leg 52 includes a keyhole aperture 64 having a wide portion 74 and a tapered portion 76. The narrowed portion 60 of the bar 58 is adapted to fit snugly within the tapered portion 76 of the keyhole aperture 64 and the head 62 is adapted to pass through the wide portion 76 of the keyhole aperture.

A clip 66 prevents the over-insertion of the bar 58 into the aperture 64 and selectively locks the ring 18 closed. The clip 66 includes a pair of opposed arms 68 and 70, which are both about as long as the head 62, joined by an intermediate member 72 to form a C-shape. The arm 70 is secured to the leg 52 at its junction with the cross member 56. The arm 68, however, is suspended by the member 72 closely adjacent the leg 52 at the junction of the wide portion 74 and tapered portion 76 of the aperture 64. The resiliency of the ring 18 allows the insertion of the head 62 into the wide portion 72 and the sliding of the narrowed portion 60 of the bar 58 into the tapered portion 76 of the aperture 64 past the leg 68. The leg 68 then effectively blocks the head 62 from being moved back into a position where it can be withdrawn through the wide portion 74 of the aperture 64.

Use of the anti-theft device 10 is straightforward. First, the device is secured to the shopping cart 20 by grasping a portion of its open metal grillwork in the open ring 18 and then locking the narrowed portion 60 of the bar 58 within the keyhole slot 64 as described above. Next, the snap hook 14 is secured to the shoulder strap 78 or any convenient part of the purse 16 by manual movement of the bolt 36 in a conventional manner. A criminal is now thwarted from quickly and surreptitiously stealing the purse 16.

While the invention has been described particularity, it will be appreciated that modifications and substitutions may be made thereto. For example, the strap 12 may be of any length and a closed metallic loop or any other suitable loop-type fastener may be substituted for the ring 18. Therefore, it is to be understood that the present invention is not limited to the sole embodiment described above, but encompasses any and all embodiments within the scope of the following claims.

We claim:

1. A purse anti-theft device, comprising:
    a flexible strap having opposed, first and second ends;
    a snap hook secured to said first end of said strap; and,
    a ring being made of a resilient material and secured to said second end of said strap, said ring including:
        a cross member having opposed, first and second ends;
        a first leg secured to said first end of said cross member;
        a second leg secured to said second end of said cross member, said second leg having a keyhole aperture therein with adjacent wide and tapered portions;
        a bar secured to said first leg at a distance from said cross member and extending toward said second leg, said bar having a narrowed portion adjacent the free end thereof adapted for snug engagement with the tapered portion of said keyhole aperture; and,
        a clip secured to said second leg for preventing the withdrawal of said bar from said second leg when said narrowed portion of said bar is engaged with said tapered portion of said keyhole aperture.

2. The purse anti-theft device according to claim 1 wherein said flexible strap includes a piece of fabric webbing having a pair of loops, formed by folding said webbing back upon itself and securing the overlapping portions together at a predetermined distance from the fold, through which said snap hook and said ring respectively extend.

3. The purse anti-theft device according to claim 1 wherein said snap hook includes:
    a body having a shank with an arcuate portion extending from one end thereof and a pin extending from the other end thereof, said shank having a longitudinal bore;
    a reciprocating bolt slidably positioned within said longitudinal bore for selectively engaging said arcuate portion;
    a spring positioned within said bore for urging said bolt into engagement with said arcuate portion; and,
    a coupling rotatably secured to said pin for securing said snap hook to said strap.

4. The purse anti-theft device according to claim 1 wherein said clip further includes:
    a first arm secured to said second leg;
    an intermediate member secured to said first arm and positioned adjacent said wide portion of said keyhole aperture for preventing the over-insertion of said bar into said keyhole aperture; and,
    a second arm secured to said intermediate member, said second arm having a free end positioned adjacent the junction of said wide portion and said tapered portion of said keyhole aperture, said free end being adapted to engage said bar and prevent said bar from being moved toward the wide portion of said keyhole aperture.

5. A purse anti-theft device, comprising:
    a flexible strap having a first end and a second end and a first loop formed at said first end and a second loop formed at said second end;
    a snap hook secured to said first end of said strap, said snap hook including:
        a body having a shank with an arcuate portion extending from one end thereof and a pin extending from the other end thereof, said shank having a longitudinal bore;
        a reciprocating bolt slidably positioned within said longitudinal bore for selectively engaging said arcuate portion;
        a spring positioned within said bore for urging said bolt into engagement with said arcuate portion; and,
        a coupling rotatably secured to said pin and extending through said first loop at said first end of said strap; and,
    a resilient ring secured to said second end of said strap, said ring including:
        a cross member having opposed, first and second ends;
        a first leg secured to said first end of said cross member;
        a second leg secured to said second end of said cross member, said second leg having a keyhole aperture therein with adjacent wide and tapered portions; and,
        a bar secured to said first leg at a distance from said cross member and extending toward said second leg, said bar having a narrowed portion adjacent the free end thereof adapted for snug engagement with the tapered portion of said keyhole aperture, said bar extending through said second loop at said second end of said strap.

6. The purse anti-theft device according to claim 5 wherein said ring further includes a clip secured to said second leg for preventing the withdrawal of said bar from said second leg when said narrowed portion of said bar is engaged with said tapered portion of said keyhole aperture.

7. The purse anti-theft device according to claim 6 wherein said clip further includes:
    a first arm secured to said second leg;
    an intermediate member secured to said first arm and positioned adjacent said wide portion of said keyhole aperture for preventing the over-insertion of said bar into said keyhole aperture; and,
    a second arm secured to said intermediate member, said second arm having a free end positioned adjacent the junction of said wide portion and said tapered portion of said keyhole aperture, said free end being adapted to engage said bar and prevent said bar from being moved toward the wide portion of said keyhole aperture.

8. A purse anti-theft device, comprising:
    a flexible strap having opposed, first and second ends, said flexible strap including a piece of fabric webbing with a pair of loops, formed by folding said webbing back upon itself and securing the overlapping portions together at a predetermined distance from the fold;
    a snap hook secured to said first end of said strap, said snap hook including:
        a body having a shank with an arcuate portion extending from one end thereof and a pin extending from the other end thereof, said shank having a longitudinal bore;
        a reciprocating bolt slidably positioned within said longitudinal bore for selectively engaging said arcuate portion;

a spring positioned within said bore for urging said bolt into engagement with said arcuate portion; and, a coupling rotatably secured to said pin and extending through said loop at said first end of said strap; and, a resilient ring secured to said second end of said strap, said ring including:

a cross member having opposed, first and second ends;

a first leg secured to said first end of said cross member;

a second leg secured to said second end of said cross member, said second leg having a keyhole aperture therein with adjacent wide end tapered portions;

a bar secured to said first leg at a distance from said cross member and extending toward said second leg, said bar having a narrowed portion adjacent the free end thereof adapted for snug engagement with the tapered portion of said keyhole aperture, said bar extending through said loop at said second end of said strap; and, a clip secured to said second leg for preventing the withdrawal of said bar from said second leg when said narrowed portion of said bar is engaged with said tapered portion of said keyhole aperture, said clip including:

a first arm secured to said second leg;

an intermediate member secured to said first arm and positioned adjacent said wide portion of said keyhole aperture for preventing the over-insertion of said bar into said keyhole aperture; and, a second arm secured to said intermediate member, said second arm having a free end positioned adjacent the junction of said wide portion and said tapered portion of said keyhole aperture, said free end being adapted to engage said bar and prevent said bar from being moved toward the wide portion of said keyhole aperture.

* * * * *